US008615256B1

(12) United States Patent
Putkiranta (10) Patent No.: US 8,615,256 B1
(45) Date of Patent: Dec. 24, 2013

(54) METHOD AND SYSTEM FOR EXPLOITING LOCATION-DEPENDENT SERVICES IN A CELLULAR RADIO SYSTEM (75) Inventor: Petteri Putkiranta, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/646,802

(22) PCT Filed: Mar. 23, 1999

(86) PCT No.: PCT/FI99/00227
§ 371 (c)(1),
(2), (4) Date: Oct. 17, 2000

(87) PCT Pub. No.: WO99/52316
PCT Pub. Date: Oct. 14, 1999

(30) Foreign Application Priority Data

Mar. 23, 1998 (FI) .......................................... 980654

(51) Int. Cl.
*H04W 24/00* (2009.01)
*H04M 3/42* (2006.01)
*H04L 29/06* (2006.01)
*H04M 1/64* (2006.01)

(52) U.S. Cl.
USPC .................. 455/456.3; 455/414.1; 455/414.2; 455/414.3; 455/456.1; 379/88.11; 379/88.12

(58) Field of Classification Search
USPC ........................... 455/404.2, 422, 440, 432.3, 455/414.2–414.3, 456.1–456.3, 433; 340/988–996
See application file for complete search history.

(56) References Cited

U.S. PATENT DOCUMENTS

| 4,740,788 | A | * | 4/1988 | Konneker | 340/7.27 |
|---|---|---|---|---|---|
| 5,301,359 | A | | 4/1994 | Van den Heuvel et al. | 455/56.1 |
| 5,371,738 | A | * | 12/1994 | Moelard et al. | 370/331 |
| 5,539,395 | A | * | 7/1996 | Buss et al. | 340/7.43 |
| 5,561,704 | A | * | 10/1996 | Salimando | 455/456.5 |
| 5,588,042 | A | * | 12/1996 | Comer | 455/413 |
| 5,603,090 | A | | 2/1997 | Nguyen et al. | 455/54.1 |
| 5,613,213 | A | * | 3/1997 | Naddell et al. | 455/435.2 |
| 5,684,859 | A | | 11/1997 | Chanroo et al. | 379/58 |
| 5,737,731 | A | * | 4/1998 | Lester et al. | 707/1 |
| 5,740,538 | A | * | 4/1998 | Joyce et al. | 455/456.2 |

(Continued)

FOREIGN PATENT DOCUMENTS

| CA | 2195487 | 8/1997 | H04Q 7/36 |
|---|---|---|---|
| EP | 0817 513 A2 | 6/1997 | H04Q 7/22 |

(Continued)

OTHER PUBLICATIONS

Japanese Office action for corresponding JP application No. 2000-542946 dated Dec. 22, 2010, pp. 1-7.

(Continued)

*Primary Examiner* — Huy C Ho
(74) *Attorney, Agent, or Firm* — Ditthavong Mori & Steiner, P.C.

(57) ABSTRACT

A communications system (100, 300) comprises base stations (101) for providing mobile stations (104) with communications links. It comprises at least one localized service area (111) and means (108, 109) for changing the service selection offered to a given mobile station on the initiative of the communications system. The change is realized in response to information (203) indicating the arrival of the mobile station in said localized service area.

20 Claims, 3 Drawing Sheets (56) References Cited

U.S. PATENT DOCUMENTS

| | | | |
|---|---|---|---|
| 5,797,097 A * | 8/1998 | Roach et al. | 455/456.2 |
| 5,819,180 A * | 10/1998 | Alperovich et al. | 455/465 |
| 5,835,061 A * | 11/1998 | Stewart | 342/457 |
| 5,887,251 A * | 3/1999 | Fehnel | 455/411 |
| 5,950,125 A * | 9/1999 | Buhrmann et al. | 455/432.1 |
| 5,963,861 A * | 10/1999 | Hanson | 455/456.1 |
| 5,974,328 A * | 10/1999 | Lee et al. | 455/456.3 |
| 6,016,425 A * | 1/2000 | Bannister | 455/432.1 |
| 6,058,301 A * | 5/2000 | Daniels | 455/411 |
| 6,073,075 A | 6/2000 | Kondou et al. | |
| 6,101,387 A * | 8/2000 | Granberg et al. | 455/433 |
| 6,157,841 A * | 12/2000 | Bolduc et al. | 455/456.5 |
| 6,199,045 B1 * | 3/2001 | Giniger et al. | 705/1.1 |
| 6,477,362 B1 * | 11/2002 | Raith et al. | 455/404.1 |
| 6,556,823 B2 * | 4/2003 | Clapton et al. | 455/432.3 |
| 6,571,096 B2 * | 5/2003 | Plunkett | 455/436 |
| 7,024,205 B1 * | 4/2006 | Hose | 455/456.1 |

FOREIGN PATENT DOCUMENTS

| | | | |
|---|---|---|---|
| EP | 0783 235 A2 | 7/1997 | H04Q 7/22 |
| EP | 0915 631 A2 | 5/1999 | H04Q 7/32 |
| FI | 102024 B | 9/1998 | H04Q 7/22 |
| FI | 102714 B | 1/1999 | H04Q 7/32 |
| FR | 2711 033 | 4/1995 | H04Q 7/22 |
| JP | 07-261661 A | 10/1995 | |
| JP | 08-087234 A | 4/1996 | |
| JP | 08-331654 A | 12/1996 | |
| JP | 09-130861 A * | 5/1997 | |
| WO | WO 97/20441 | 6/1997 | H04Q 7/22 |
| WO | WO 97/34437 | 9/1997 | H04Q 7/38 |

OTHER PUBLICATIONS

Office Action for related U.S. Appl. No. 13/072,443 dated Oct. 11, 2011, pp. 1-29.

Final Rejection for U.S. Appl. No. 13/072,443 dated Apr. 12, 2012, pp. 1-26.

* cited by examiner

METHOD AND SYSTEM FOR EXPLOITING LOCATION-DEPENDENT SERVICES IN A CELLULAR RADIO SYSTEM

PRIORITY CLAIM

This is the U.S. national stage of international PCT Application No. PCT/FI99/00227, filed on Mar. 23, 1999. Priority is claimed from that application and the priority document cited in that application, namely, Finnish Patent Application No. 980654, filed Mar. 23, 1998, both of which are hereby incorporated by reference.

FIELD OF INVENTION

The invention relates in general to the provision and delivery of services offered by a network to a mobile station. In particular the invention relates to the utilization of information concerning the location of a mobile station for the purpose of providing services.

BACKGROUND OF THE INVENTION

A modern communications network provides mobile station owners with individual programmable services. A digital telephone network is one such network. Services known to be provided by it include programmable call transfer and voice mail system, which usually are implemented at a switching center. Networks are also known in which certain services are provided by an outside service provider who pays to the communications network operator for the use of their network, and the services provided by said service provider are located physically elsewhere than at switching centers. This patent application uses a digital cellular radio system as an example of a communications network.

In known networks the provision of services has not depended on the part of the network the user is located in when he places a call to an apparatus or equipment providing a service. According to a recent proposal, however, different locations can be specified for a mobile station in a network. Then, as a mobile station is registered in a cell, the service that it receives may be different according to its location. However, it would be advantageous in various situations if different services could be offered to the user according to his physical location on the initiative of the network, without the mobile station actually establishing a connection to the network. Such services are called network initiated services, and they include so-called push services in which an apparatus connected to the network sends data to mobile stations without the mobile stations requesting said information. An example of a locally arranged push service which cannot be implemented using prior-art solutions is to send the day's menu at a cafeteria of a company to the mobile stations of all those employees who are within the premises of the company as lunchtime is approaching.

The reference publication CA 2,195,487 discloses the definition of a so-called user zone, which consists of one or more cells and/or cell sectors. It is on the responsibility of a mobile telephone switching office (more commonly known as the MSC or Mobile services Switching Centre) to store a user zone profile and to modify a service profile for a cellular telephone when that cellular telephone is situated within the user zone.

The reference publication EP 0 783 235 describes a method for identifying the proximate location of a wireless terminal. As an application of such location identification, the publication mentions the possibility of offering position-related weather reports to the users of wireless terminals. This is another example of known applications of location-dependent service profiles. The reference publication FR 2 711 033 discloses the use of a location server which specializes in finding out the approximate locations of mobile stations.

SUMMARY OF THE INVENTION

An object of the present invention is to provide a method and system for making services provided by a network available to the user in various ways depending on the location of the user, without placing large requirements to the network.

The objects of the invention are achieved by storing in the memory of the mobile station the information on the basis of which it recognizes that it is situated in a given localized service area and by programming the mobile station such that in response to such recognition it sends an appropriate message to an apparatus that provides services.

The invention pertains to a communications system that comprises base stations for providing mobile stations with communications links and at least one localized service area. It is characterized in that it comprises a service server which is arranged to maintain information concerning the location of mobile stations in localized service areas and to generate requests for changing the service selection offered to mobile stations in response to receiving, from the mobile stations, mobile station generated messages describing the location of the mobile stations in relation to localized service areas, and means for changing the service selection offered to a mobile station on the initiative of the communications system in response to an indication of the arrival of the mobile station in said localized service area.

The invention also pertains to a cellular mobile station that comprises a control block and storage means. It is characterized in that its storage means are adapted so as to store the information required to recognize a given localized service area whereby the mobile station is arranged so as to send—in response to the recognition of a localized service area—a notification of its arrival in the localized service area, said notification being intended to function as an impulse for changing the service selection offered to the mobile station.

The invention further pertains to a method for changing the service selection offered to a mobile station in a communications system that comprises base stations for providing mobile stations with communications links. The method is characterized in that it comprises steps in which     from the mobile station there is received a message indicating that the mobile station has detected that it is in the localized service area     information is generated about the arrival of a mobile station in a localized service area, and     the service selection offered to said mobile station on the initiative of the communications system is changed.

In accordance with the invention, localized service areas (LSA) are defined for mobile stations, which areas may be purely geographical or may have some other criteria. In addition to or instead of the geographical definition a localized service area may be defined e.g. in chronological terms. "Geographical definition" means generally definitions associated with a place or area: a localized service area may comprise a base station cell, several cells, a location area (LA), a public land mobile network (PLMN), an area defined by coordinates, certain cell identifiers, or an area in which base stations send to mobile stations some other identifier. Combinations of these alternatives may be used, too.

Information about how a mobile station can recognize that it is in a given localized service area is stored in the memory of the mobile station. Since services are usually in a way or another associated with the subscription contract in which the user is given certain user-specific rights to use the communications network, it is preferable to store the information relating to the recognition of a localized service area in the user's SIM (subscriber identity module) card or a corresponding memory means intended specifically for the identification of the user independent of the apparatus used. In response to a positive identification the user's mobile station sends a message addressed to an apparatus responsible for providing localized services in the network. With this message the mobile station tells that the user is in a certain localized service area. On the basis of the message the network can offer to the user just those services that are needed in that localized service area. When the mobile station moves elsewhere, it sends a similar message telling that it is leaving the localized service area. The network may also automatically deduce that the mobile station has left the area as a certain condition is met. Such conditions include e.g. that

- the mobile station does not respond to the next paging message or another message sent in the localized service area in question,
- the mobile station does not acknowledge a data packet addressed to it,
- the mobile station does not in a certain period of time renew its message of arrival in the localized service area, or
- the mobile station does not in a certain period of time send another message that must be sent periodically, such as the periodic location update (PLU) message, for example.

The apparatus, to which the mobile station addresses its location message, may be maintained by the network operator or a service provider. The message may be an SMS (Short Message Service) message, an unstructured supplementary service data (USSD) message, a DTMF-coded (Dual Tone Multi-Frequency) message sent in conjunction with an ordinary call, or a data call. In response to the message the apparatus, to which the mobile station addresses its location message, may e.g. send information about the area in question to the mobile station or start the regular or periodic sending of such information, which goes on until the mobile station leaves the localized service area. Furthermore, the apparatus providing the services may activate or inactivate another localized service, send information about the location of the mobile station to other apparatus which need that information in their operation, or carry out some other function. One option is that mobile stations are assigned certain localized service profiles which may comprise various factors from call pricing to data rates of data calls or to priorities of call establishment and management. The application of the service profile is in that case based on the location of the mobile station in a given localized service area.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention is below described in more detail with reference to the preferred embodiments presented by way of example and to the accompanying drawing in which.

DETAILED DESCRIPTION OF THE PRESENTLY PREFERRED EMBODIMENTS

Figure 1:
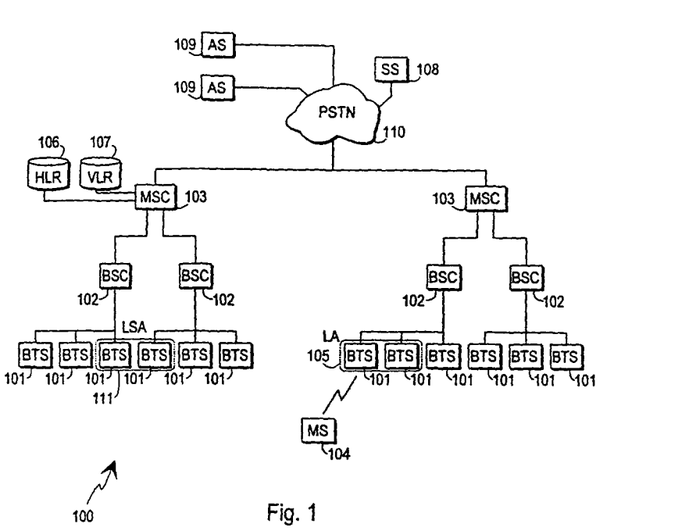
FIG. 1 shows a communications system according to the invention.

FIG. 1 shows a cellular radio system 100 which in a known manner comprises base transceiver stations (BTS) 101, base station controllers (BSC) 102 and mobile switching centers (MSC) 103. A mobile station (MS) 104 is connected via radio to at least one base transceiver station 101 so that the system considers the mobile station to be located in that location area (LA) 105 to which the coverage area, or cell, of that particular base transceiver station belongs. A location area may comprise one or more cells. For the purpose of maintaining location data of mobile stations and routing calls the system includes home location registers (HLR) 106 and visitor location registers (VLR) 107 which usually are located at mobile switching centers. In the system according to FIG. 1 a service server (SS) 108 and application servers (AS) 109 are also connected to the cellular radio network through wire links Connections from the cellular radio network to servers 108 and 109 may be either direct, in which case the servers are in a way part of the cellular radio system, or routed via the public switched telephone network (PSTN) 110. Direct connections will be used mainly when servers 108 and 109 are maintained by the same operator who is responsible for the operation of the cellular radio system.

A prerequisite for the operation according to the invention is that somehow a piece of information is generated indicating that a mobile station is located in a certain designated localized service area 111. As was mentioned above, a localized service area may be the same as a given location area but nothing prevents from defining localized service areas completely differently; in FIG. 1 the localized service area 111 includes base transceiver stations under two different base station controllers. According to a first embodiment of the invention, however, a service area always comprises a certain cell or certain cells. If the coverage area of a base transceiver station can by means of directional antennas be divided into cells or blocks smaller than the central cell around the base transceiver station such that the system can make a logical distinction between those cells or blocks, then these smaller areas can also be utilized in defining the localized service area. The information about the location of a mobile station in a service area can then be generated either at the mobile station, which is regarded as the more preferable embodiment, or in fixed parts of the system. A limitation of the latter option is that since known cellular radio systems maintain mobile station location data only with the accuracy of a location area, defining a localized service area smaller than one location area would call for changes in the operation of the system.

Let us then assume that the information about the location of a mobile station in a localized service area is generated at the mobile station itself. To that end there exist several known methods which usually are based on the fact that every base transceiver station in known cellular radio systems sends general control information that can be received in the whole cell area and which e.g. comprises the unequivocal identifier of the base transceiver station or some other information characteristic of the base transceiver station. A method for detecting base station specific identifiers has been stored in advance in the mobile station. In the simplest case the memory of the mobile station stores a list of the identifiers of the base transceiver stations the cells of which make a particular localized service area. By comparing the received identifier with the list in the memory the mobile station finds out whether it is located in a certain localized service area. According to an alternative embodiment only a certain mask is stored in the memory of the mobile station so that the mobile station uses the mask to select certain characters from the base station specific identifier to be examined. If the characters examined form or follow a certain pattern the base station cell belongs to a localized service area. An advantage of this embodiment is that if the communications capacity of the localized service area is increased by establishing a new base station in the area, there is no need to separately send the identifier of the new base station to each mobile station to which the localized service area has been assigned; it suffices that the masked characters in the new base station identifier are the same as or corresponding to those of the other base stations in that localized service area.

According to a second embodiment of the invention a localized service area is not associated with base station cells but has certain geographic coordinates. In this embodiment a mobile station may detect that it is in a given service area e.g. in such a manner that each base station sends together with the general control information information about the location of the base station in a geographic coordinate system. Having received the coordinates the mobile station may examine whether the point indicated by the coordinates is located within a localized service area assigned to the mobile station. In a more versatile method the mobile station may receive coordinates from all the base stations from which it can receive general control information, and assume that its own location is the average of the coordinates received. By comparing the location it has computed with the stored geographic definition of the localized service area the mobile station detects whether or not it is in the localized service area. Future mobile stations may include a GPS (Global Positioning System) receiver or some other means completely independent of base stations to determine the location of the mobile station in a geographic coordinate system. This makes it possible to define a localized service area completely independent of the cellular radio system cells.

According to a third embodiment of the invention, temporal dimension is also included in the definition of a localized service area. If a cellular radio system comprises cells A, B, C, D and E, it can be defined that a given localized service area comprises at all times cells A and B, but cell C only between 12 and 3 o'clock in the afternoon, and cells D and E on Wednesday, Friday and Saturday from 6 p.m. till 3 a.m. in the next morning. Naturally the temporal dimension may also be combined with the cell-independent geographic definition described above.

Figure 2:
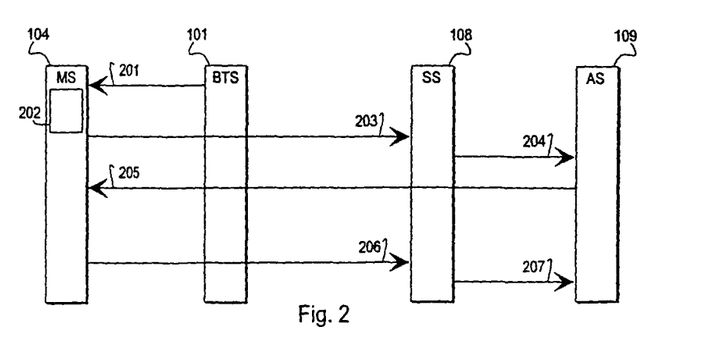
FIG. 2 illustrates the exchange of messages in the communications system according to FIG. 1.

FIG. 2 assumes that the information about the location of a mobile station in a given service area is generated at the mobile station on the basis of a base station specific identifier received by the mobile station from the base station. The figure illustrates in a simplified manner the exchange of messages relating to the operation according to a preferred embodiment of the invention between a mobile station 104, base transceiver station 101, service server 108 and application server 109. The messages are depicted by arrows and their chronological order is from top down. Message 201 is a known general control information message sent by the base station to the mobile station, comprising a base station specific identifier. General information messages include e.g. information sent by base stations on the broadcast control channel (BCCH) in the GSM system. Block 202 refers to the comparison at the mobile station with an identifier list, or some other activity on the basis of which the mobile station detects that it has arrived in a certain localized service area. In response to that observation the mobile station sends to the service server a message 203 in which it includes an identifier characteristic of the mobile station, say an IMSI (International Mobile Subscriber Identifier) code or MS-ISDN (Mobile Subscriber Integrated Services Digital Network) number stored in the SIM card of the mobile station.

The invention does not limit the form of message 203. One advantageous option is to use an SMS message such that the mobile station reads from the memory the phone number of the service server and sends the SMS message to that number. A second option is to use a free-form data message specified in many digital cellular radio systems; in the GSM it is called an USSD message. The mobile station may also by itself establish a call connection to the service server and send the message 203 DTMF-coded or as a data call.

The role of the service server in the embodiment according to FIG. 2 is to maintain information about which mobile stations are in which localized service areas and which services should be offered to them accordingly. The actual service is provided by the application server. Having received message 203 the service server reads from its memory which services should be offered to the mobile station in that localized service area and sends a service request 204 to the appropriate application server. The information about what services are provided by which application servers is also stored in the memory of the service server so that it can send the service request 204 to the correct application server. The invention does not limit the form of the service request 204. From the prior art it is known several methods for realizing communication between two servers connected to a communications network.

In response to a service request 204 the application server provides the mobile station with a service, indicated in FIG. 2 simply by an arrow 205. The service is not necessarily a simple message and its commencement does not necessarily involve only information sent to the mobile station. A mobile station may have a whole service profile defined for it in a localized service area, including e.g.

call pricing or prioritization,
limitations concerning the modulation method, data rate and/or connection quality in the communication between the base station and mobile station,
routing of incoming email messages to a mobile station instead of the user's desktop workstation, or
activation or inactivation of automatic call transfer and/or voice mail service.

The mobile station may also have the right or obligation in a given localized service area to receive messages periodically e.g. with regard to the weather, traffic, stock exchange rates and so on. Thus the application server may at the stage represented by arrow 205 establish connections in a versatile manner with various apparatus in the cellular radio system or in communication with the cellular radio system. On the other hand, the service server may have instructions stored in its memory to request services from more than one application server, in which case there would be several messages 204 sent to a plurality of application servers.

FIG. 2 further assumes that the mobile station leaves the localized service area in accordance with controlled cell reselection in which case it sends to the service server a notification 206 about its departure from the service area. In response to the departure message the service server sends to the application server a request 207 to terminate the service. The mobile station can send message 206 via the old base station always when leaving a cell belonging to the localized service area regardless of whether the new cell belongs to the same localized service area. In an alternative embodiment the mobile station checks always after a cell reselection whether it is still in the same localized service area, and if not, it sends via the new base station a notification about its departure to the service server. According to a second alternative embodiment mobile stations do not send departure messages at all but the departure of a mobile station from a given localized service area is detected by fixed parts of the system e.g. when a mobile station will not respond to a paging message or another message sent to it in that localized service area, or will not send the specified periodic location update message or some other mandatory periodic notification, or when the service server sends regularly or periodically to all mobile stations in a localized service area a short data message which must be acknowledged by the mobile stations; a failure to acknowledge the message indicates that the mobile station in question is no more in the localized service area.

Above it was disclosed that in a given localized service area a mobile station receives a certain service. However, service areas may be defined which are characterized in that a mobile station will not be offered a service that it would receive elsewhere. A mobile station may be assigned several service areas with different operating instructions for the different areas. The service server which the mobile station informs about its arrival in a localized service area may be always the same or different in some localized service areas. Alone the fact that whether or not a mobile station indicates its arrival in a localized service area and if so, how quickly it does it, may depend on the service area. The user may be given a choice about whether or not to give notification about his arrival in a localized service area. The mobile station may even inform the user that he has now arrived in a localized service area and ask for permission to send the notification of arrival. In connection with the request for permission the user may be given a short description of the consequences of sending the notification of arrival. On the other hand, certain localized service areas may be defined by the network operator such that the notification of arrival is compulsory, whereby a mobile station has to send a notification of arrival every time that it arrives in such a localized service area regardless of what the user instructs the mobile station to do.

Above it was disclosed that the service server and application server are separate apparatus. However, these functions can be integrated in one device, whereby the communication between the servers as described above is reduced to communication internal to a server. One or both of them may also be implemented in connection with a known apparatus that already belongs to the cellular radio system. Servers can advantageously be integrated in mobile switching centers or base station controllers.

Figure 3:
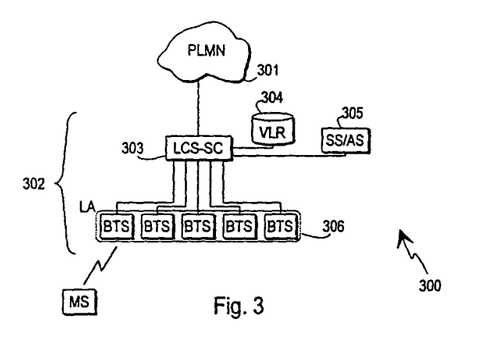
FIG. 3 shows a second communications system according to the invention.

FIG. 3 shows a communications system 300 according to the invention, in which a localized cellular service (LCS) 302 operates under a public land mobile network (PLMN) 301 in an area with a high traffic density; the mobile switching center maintaining the service is called an LCS switching center (LCS-SC) 303. The LCS-SC operates just like a prior-art mobile switching center. It provides for the internal communication of the LCS and establishes, maintains and terminates connections between terminal equipment in the LCS and elsewhere. In connection with the LCS-SC there is a visitor location register 304 and a combined service and application server 305, which is called simply a server. In this embodiment of the invention the localized service area 306 covers all base stations operating under the LCS-SC (for simplicity, the base station controllers are not shown). Unlike above, the observation that a given mobile station has arrived in the localized service area is made in the fixed parts of the network, more specifically in the visitor location register 304. Let the cellular subsystem shown in FIG. 3 operate at an airport. Airline companies can provide the visitor location register 304 with the mobile phone numbers or other identifiers of their customers to whom certain benefits have been granted on the basis of their being frequent flyers, for example. As the visitor location register 304 detects that a mobile station associated with such an identifier has arrived in the area of the cellular subsystem, it sends appropriate information to the server 305. Instead of or in addition to the visitor location register other fixed network apparatus may take part in the sending of the message. In response to this information the server 305 starts sending to the mobile station announcements which are intended only to privileged customers of the airline companies. The announcements are advantageously delivered as SMS messages.

In known digital telephone systems the sending of SMS messages is carried out via SMS service centers and not directly from an apparatus to another. However, for simplicity the SMS service centers are not included in the description above but their use is considered to be known to a person skilled in the art. Other messages described above may also be sent between apparatus via various known intermediary devices.

Figure 4:
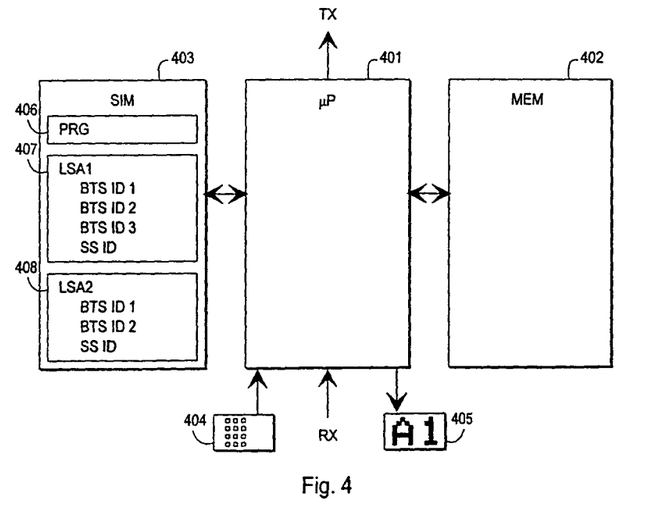
FIG. 4 shows a mobile station according to the invention.

FIG. 4 shows simplified a control block and some memory parts of a mobile station according to the invention. The control block 401 is preferably a microprocessor which is located in the mobile station in a known manner such that data received by the mobile station, except for data intended to be presented directly to the user, is conducted from the receiver chain RX to the control block and, correspondingly, outgoing data produced by the control block is conducted to the transmitter chain TX of the mobile station together with the data coming directly from the user (say, digitized speech). In the mobile station according to FIG. 4 the control block has access to a fixed memory 402 and a removable memory unit 403, which is e.g. a smart card. The control block 401 also receives input from a keypad 404 and it outputs information on a display 405. A program executed by the control block 401 is stored in the fixed memory 402. Part of that program is an instruction to look for program extensions in the removable memory unit 403. For the operation according to the invention the removable memory unit includes a program 406 by means of which the mobile station is able to utilize localized service areas, as well as information. 407, 408 about at least one localized service area (LSA1, LSA2). FIG. 4 assumes that the recognition of a localized service area is based on the mobile station comparing received base transceiver station identifiers (BTS ID) with a list of localized service areas stored in the memory. For each localized service area the removable memory unit 403 also includes a service server identifier (SS ID).

Figure 5:
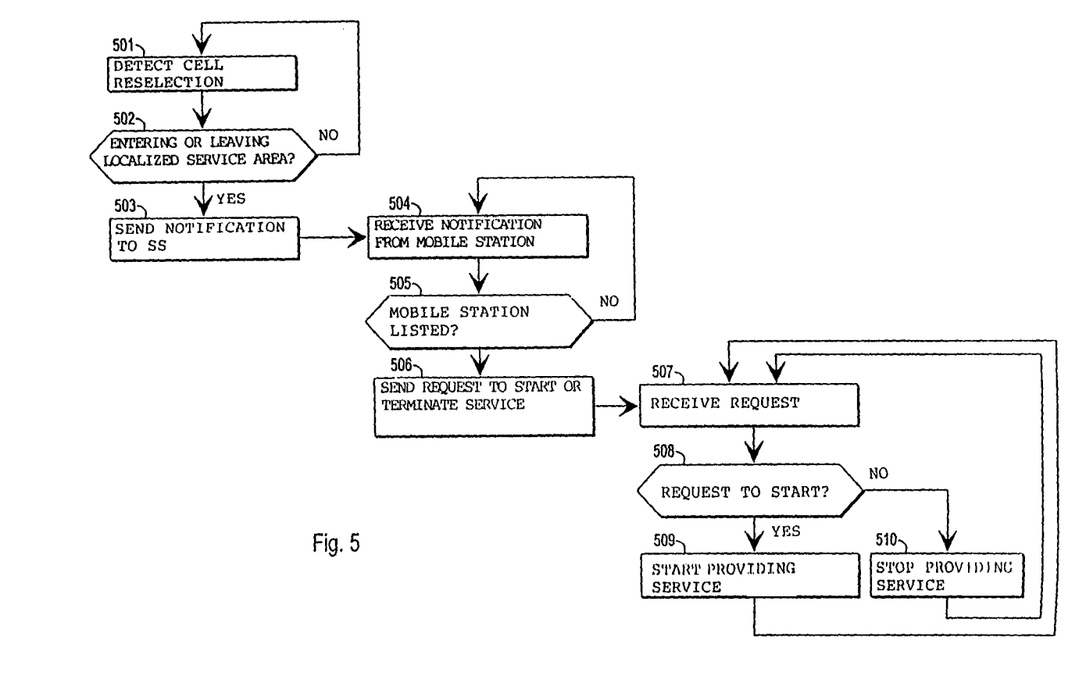
FIG. 5 shows an embodiment of the method according to the invention.

FIG. 5 illustrates the principle of a method according to a preferred embodiment of the invention in a mobile station, service server and application server. In accordance with block 501 the mobile station detects a cell reselection. It examines, block 502, whether any changes are occurring with respect to localized service areas, i.e. whether it is arriving in a localized service area (if until now it wasn't in one) or if it is leaving a localized service area (if until now it was in one). In accordance with block 503 the change triggers the sending of a message to a service server the operation of which starts from the reception of the message, block 504. According to block 505 the service server examines whether the mobile station in question is on the list of those to be served. If the mobile station is arriving in a localized service area, it is in block 505 recognized as a mobile station which is to be served. If, on the other hand, the mobile station is leaving a localized service area, it is recognized in block 505 as a mobile station the services to which have to be terminated. A corresponding message is sent according to block 506 to an application server which receives the message in block 507 and determines in block 508 whether the message calls for the starting or termination of a service. The service is then either started 509 or terminated 510 for the mobile station, whichever the case may be.

The embodiments of the invention described above are naturally examples only and do not limit the invention. Communications systems, to which the invention can be advantageously applied, include e.g. second-generation digital mobile phone systems such as the GSM and its extensions, PDC (Personal Digital Cellular), D-AMPS (Digital Advanced Mobile Phone System) and PCS (Personal Communications Services) and future third-generation digital cellular radio systems such as the UMTS (Universal Mobile Telecommunications System) and IMT-2000 (International Mobile Telecommunications at 2000 MHz).

Thus, while there have been shown and described and pointed out fundamental novel features of the present invention as applied to a preferred embodiments thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
      generate a message when the apparatus determines that the apparatus arrives in a localized service area offering one or more services that are localized based upon the localized service area and available only within the localized service area, the message specifying that the apparatus is in the localized service area;
      cause, at least in part, transmission of the message to a communications system; and
      receive, in response to the message, the one or more localized services.

2. An apparatus of claim 1, wherein the apparatus is a mobile phone, and said at least one memory includes a removable memory.

3. An apparatus of claim 1, wherein the apparatus determines that the apparatus arrives in the localized service area by: comparing a current geographic location of the apparatus with a geographic definition of the localized service area stored at the apparatus, and determining the apparatus is located in the localized service area when the current geographic location of the apparatus is within the geographic definition of the localized service area.

4. An apparatus of claim 3, wherein the apparatus is further caused to:
   receive control information from a plurality of base stations, the control information including geographic coordinates of each respective one of the base stations; and
   average the geographic coordinates of the base stations to obtain the current geographic location of the apparatus.

5. A method comprising:
   generating, at a mobile station, a message when the mobile station determines that the mobile station arrives in a localized service area offering one or more services that are localized based upon the localized service area and available only within the localized service area, the message specifying that the mobile station is in the localized service area; and
   causing, at least in part, transmission of the message to a communications system; and
   receiving, in response to the message, the one or more localized services.

6. A method of claim 5, further comprising:
   in response to the message, receiving one or more service changes at the mobile station.

7. A method of claim 6, wherein said one or more service changes involve sending of announcements to the mobile station.

8. A method of claim 5, wherein the mobile station determines that the mobile station arrives in the localized service area by: comparing a current geographic location of the mobile station with a geographic definition of the localized service area stored at the mobile station, and determining the mobile station is located in the localized service area when the current geographic location of the apparatus is within the geographic definition of the localized service area.

9. A method of claim 8, further comprising:
   receiving control information from a plurality of base stations at the mobile station, the control information including geographic coordinates of each respective one of the base stations; and
   averaging the geographic coordinates of the base stations to obtain the current geographic location of the mobile station.

10. A method of claim 5, wherein the message is either a short message service message, an unstructured supplementary service data message, or a dual tone multi-frequency-coded message.

11. A method of claim 5, wherein the message is sent to the communications system in conjunction with a telephone call or a data call.

12. A method of claim 5, wherein the one or more available services include announcements specific for the localized service area.

13. A method of claim 5, wherein the localized service area is an airport or a cafeteria.

14. A method of claim 5, wherein the localized service area is defined independently from cells, and the current geographic location of the mobile station includes geographic coordinates.

15. A method of claim 5, further comprising:
   causing, at least in part, transmission of a notification indicating that the mobile station determines that the mobile station departs the localized service area to change reception of the one or more available services.

16. A method of claim 5, wherein the localized service area is defined in a chronological term, a temporal dimension, or a combination thereof.

17. A method of claim 5, wherein the one or more available services include call pricing, call prioritization, a modulation method limitation, a communication data rate, communication connection quality, routing of incoming data to the mobile station or another mobile station, activation or inactivation of automatic call transfer, activation or inactivation of a voice mail service, or a combination thereof.

18. A non-transitory computer-readable storage medium carrying one or more sequences of one or more instructions which, when executed by one or more processors, cause an apparatus to at least perform the following steps:
   generating a message when the apparatus determines that the apparatus arrives in a localized service area, the message specifying that the apparatus is in the localized service area offering one or more services that are localized based upon the localized service area and available only within the localized service area; and
   cause, at least in part, transmission of the message to a communications system; and
   receiving, in response to the message, the one or more localized services.

19. A non-transitory computer-readable storage medium of claim 18, wherein the apparatus determines that the apparatus arrives in the localized service area by:
   comparing a current geographic location of the apparatus with a geographic definition of the localized service area stored at the apparatus, and
   determining the apparatus is located in the localized service area when the current geographic location of the apparatus is within the geographic definition of the localized service area.

20. A non-transitory computer-readable storage medium of claim 18, wherein the apparatus is caused to further perform:
   receiving control information from a plurality of base stations, the control information including geographic coordinates of each respective one of the base stations; and
   averaging the geographic coordinates of the base stations to obtain the current geographic location of the apparatus.

* * * * *